United States Patent
Coleman

[19]

[11] Patent Number: 6,045,044
[45] Date of Patent: *Apr. 4, 2000

[54] METHOD AND APPARATUS FOR REDUCING BANDWIDTH LIMITED NOISE IN BAR CODE SCANNER

[75] Inventor: Edward P. Coleman, Fairport, N.Y.

[73] Assignee: PSC, Inc., Webster, N.Y.

[*] Notice: This patent is subject to a terminal disclaimer.

[21] Appl. No.: 09/218,157

[22] Filed: Dec. 22, 1998

Related U.S. Application Data

[63] Continuation of application No. 08/622,234, Mar. 20, 1996, Pat. No. 5,852,286.

[51] Int. Cl.$^7$ .................................................. G06K 7/10
[52] U.S. Cl. ........................ 235/462.49; 235/462.26; 235/462.06
[58] Field of Search ........................ 235/462.06, 462.27, 235/462.28, 462.29, 462.42

[56] References Cited

U.S. PATENT DOCUMENTS 5,457,309  10/1995  Pelton ...................................... 235/462
5,852,286  12/1998  Coleman ................................. 235/462

*Primary Examiner*—Karl D Frech
*Attorney, Agent, or Firm*—Foley & Lardner

[57] ABSTRACT

A bar code scanner system includes a laser light source that periodically produces a light beam that is swept across a bar code label. The laser light source is periodically turned "on" and "off" according to a duty cycle. A detector produces a first electric signal representative of received bar code label reflected light and ambient light when the laser light source is on, and produces a second electric signal representative of received ambient light when the light source is "off". A demodulator circuit, coupled to the detector, provides a first gain to the first electric signal and provides a second gain to the second electric signal. The gains applied are selected such that the signal and signal component produced solely as a result of the ambient light will significantly cancel out one another when the signals are combined. A filter, coupled to the demodulator circuit, receives the electric signals from the demodulator circuit and reduces out-of-band signal components such as noise. When the duty cycle of the laser light source is equal to 50%, the first gain is equal to the inverse of the second gain.

2 Claims, 8 Drawing Sheets

6,045,044

METHOD AND APPARATUS FOR REDUCING BANDWIDTH LIMITED NOISE IN BAR CODE SCANNER

This application is a continuation of application Ser. No. 08/622,234, filed Mar. 20, 1996, now U.S. Pat. No. 5,852,286.

FIELD OF THE INVENTION

The present invention generally relates to bar code scanner circuitry and, more particularly, to bar code scanner circuitry for reducing the negative effects of modulated ambient light.

BACKGROUND OF THE INVENTION

Bar code scanners are used widely in many diverse applications. Bar code scanners offer a fairly simple means of monitoring large volumes of items. Bar code scanners are used, for example, to track inventory, at check-out areas of retail stores, and in assembly line manufacturing applications, for examples.

In bar code technology, a bar code label typically includes a series of parallel dark and light bars of different widths that represent a unique code. Bar code scanners are used to optically detect the code represented by the bar code label. A bar code scanner typically includes a laser light source, a photodetector, an amplifier, a filter and processing circuitry. The laser light source provides a laser beam which is swept across, and reflects from, the bar code label. The light reflected from the bar code label scatters, and some of the scattered light is received by the photodetector. The photodetector produces an analog electric signal. The amplitude of the analog signal represents the width of one of the series of light and dark bars of the bar code label. The amplifier receives the analog electric signal produced by the photodetector and amplifies the signal.

The amplified electric signal then is provided to a filter, typically a bandpass analog filter, which reduces signal components of the amplified electric signal outside of the frequency band of interest. The filtered electric signal then is provided to the processing circuitry (which can include a combination of analog and digital circuitry) for processing the signal to determine the code represented by the bar code label.

With such processing circuitry, it is desirable to achieve a high signal-to-noise ratio to ensure that the code represented by the bar code label is accurately detected. The signal-to-noise ratio of the circuitry depends on many factors including, for example, the precise quality of the bar code label, the accuracy with which the laser light beam is swept across the label, the background illuminance of the bar code label, the quality of the circuitry, the intensity of the input laser beam and the ambient light noise present.

Bar code scanners sometimes are used in environments in which ambient modulated light (e.g., fluorescent light) is present. In such environments, the ambient light modulation is detected by the photodetector and processed by the processing circuitry thereby reducing the signal-to-noise ratio of the circuitry and potentially causing a faulty reading of the bar code label.

As such, it is a general object of the present invention to provide simple, yet accurate bar code scanner circuitry for reducing the negative effects of modulated ambient light.

SUMMARY OF THE INVENTION

To achieve the foregoing object, there is provided a first nonsampling embodiment of a bar code scanner system including a laser light source that periodically produces a light beam that is swept across a bar code label, the laser light source being periodically turned "on" and "off" according to a duty cycle. A detector produces a first electric signal representative of the received ambient and bar code label reflected light when the light source is on, and produces a second electric signal representative of the received ambient light when the light source is "off". A demodulator circuit, coupled to the detector, provides a first gain to the first electric signal and provides a second gain to the second electric signal. The gains applied are selected such that the signal and signal component produced solely as a result of the ambient light will significantly cancel out one another when the signals are combined. A filter, coupled to the demodulator circuit, receives the electric signals from the demodulator circuit and reduces out-of-band signal components such as noise.

The system further includes a laser pulser, coupled to the laser light source and the demodulator circuit, to control the duty cycle of the laser light source. The first and second gains are related to the duty cycle.

In one embodiment, the demodulator circuit is an analog circuit. In another embodiment, the demodulator circuit is a digital circuit. In one embodiment, the filter is a digital filter. In another embodiment, the filter is an analog filter.

The system further includes a transimpedance amplifier, coupled between the photodetector and the demodulator, that converts current of the electric signals to voltage. The demodulator preferably is clocked at the same rate as the period of the duty cycle. In one embodiment of the invention, that period approximately is equal to 500 kHz.

The first gain is the inverse of the second gain when a 50% duty cycle is used.

Another embodiment of the invention is directed to a sampling bar code scanner system that includes a laser light source that periodically produces a light beam that is swept across a bar code label. The laser light source periodically is turned "on" and "off" according to a duty cycle. A detector produces a first electric signal representative of both the received ambient light and bar code label reflected light when the light source is "on", and produces a second electric signal representative of only the received ambient light when the light source is "off". At least one sample and hold circuit, coupled to the detector, produces a first sampled signal from the first electric signal and produces a second sampled signal from the second electric signal. A difference amplifier, coupled to the sample and hold circuit, generates a difference signal that is equal to the difference between the first and second sampled signals. Preferably, the sample and hold circuit includes first and second sample and hold circuits.

The system further includes a filter, coupled to the difference amplifier, that reduces out-of-band signal components of the difference signal. In one embodiment, the filter is an analog filter. In another embodiment, the filter is a digital filter.

The system further includes a laser pulser, coupled to the laser light source and the sample and hold circuit, that controls the duty cycle of the laser light source. The first sample and hold circuit is enabled when the laser light source is "on" and the second sample and hold circuit is enabled when the laser light source is "off".

In another embodiment of the present invention, the bar code scanner system includes digital demodulation circuitry. A laser light source periodically produces a light beam that is swept across the bar code label. The laser light source is periodically turned "on" and "off" according to a predetermined duty cycle. A detector produces a first electric signal representative of the received ambient light and bar code label reflected light when the light source is on, and produces a second electric signal representative of only the received ambient light when the light source is "off". An analog-to-digital converter ("ADC"), coupled to the detector, respectively converts the first and second electric signals to first and second digital words. A digital circuit, coupled to the ADC, provides a first gain to the first digital word and provides a second gain to the second digital word. A filter, coupled to the digital circuit, receives the digital words from the digital circuit and reduces out-of-band signal components.

In one embodiment, the filter is a digital filter. In this embodiment, the system further includes a digital-to-analog converter ("DAC"), coupled to the digital filter, that converts the filtered words to an analog signal.

The digital circuit includes first and second gain elements, wherein the first gain element is enabled when the laser light source is "on" and the second gain element is enabled when the laser light source is "off".

The system further includes a laser pulser, coupled to the laser light source, that controls the duty cycle of the laser light source.

The system also includes a transimpedance amplifier, coupled between the detector and ADC, that converts current of the electric signals to voltage.

The system also includes a derivative amplifier, coupled to the DAC, for amplifying the analog output signal of the DAC.

According to a further embodiment of the invention, a method for detecting the code of a bar code label comprises the steps of: with a light source, periodically producing a light beam that is swept across a bar code label according to a predetermined duty cycle; receiving ambient light and light reflected from the bar code label when the light source is on; producing a first electric signal representative of the intensity of the received ambient light and bar code label reflected light; receiving ambient light when the light source is off; producing a second electric signal representative of the intensity of the received ambient light; providing a first gain to the first electric signal; providing a second gain to the second electric signal; and filtering out-of-band signal components of the electric signals.

The method further includes the step of controlling the duty cycle. The method also includes the step of controlling the first and second gains based on the duty cycle. The method further includes the step of converting current of the electronic signals produced to voltage.

An even further embodiment of the present invention is directed to a method for reducing the effects of ambient light in a bar code scanner system comprising the steps of: controlling the duty cycle of a laser light source to repeatedly turn "on" and "off" the light source; producing a first electric signal representative of light received by a photodetector when the light source is on; producing a second electric signal representative of light received by the photodetector when the light source is off; and providing a first gain to the first electric signal and a second gain to the second electric signal such that ambient light signal components will be significantly canceled when the signals are combined.

This method includes setting the second gain to be the inverse of the first gain when the duty cycle is equal to 50%. The method alternatively includes the step of setting the first gain to 4 and the second gain to −1 when the duty cycle is equal to 20% on/80% "off". The method further includes the step, after the steps of producing, of separately sampling and holding the first and second electric signals.

The method, in one embodiment, includes the step of digitally providing the first gain to the first electric signal and the second gain to the second electric signal. In another embodiment, the method includes using analog circuitry to provide the first gain to the first electric signal and the second gain to the second electric signal.

The features and advantages of the present invention will be more readily understood and apparent from the following detailed description of the invention, which should be read in conjunction with the accompanying drawings and from the claims which are appended to the end of the detailed description.

DETAILED DESCRIPTION

Figure 1A:
FIG. 1 is a block diagram of a first, nonsampling embodiment of a bar code scanner system of invention.
Figure 1:
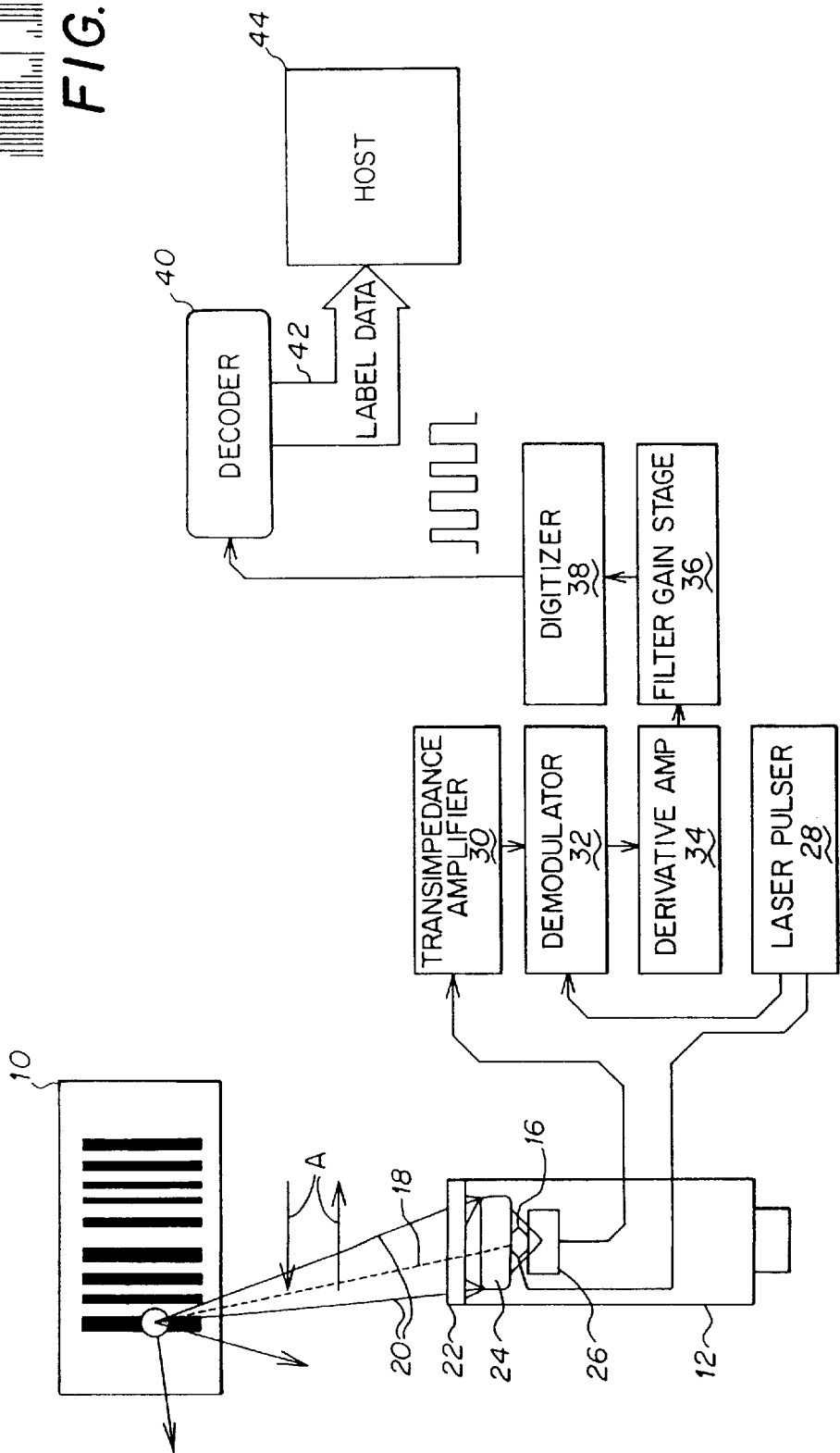

FIG. 1 is a block diagram of a first embodiment of the bar code scanner system of the present invention. Shown in FIG. 1 is a typical bar code label 10 including multiple dark and light parallel bars of different widths that represent a particular code. Also shown is a bar code scanner having a scanner head 12 and processing circuitry. Scanner head 12 is shown partially diagrammatically and partially schematically. Scanner head 12 includes a laser light source 16 that produces an illuminating beam 18 that is swept across the bar code label in the directions of arrows labeled A. Reflected from the bar code label are scattered light beams 20.

Window 22, located at the end of scanner head 12 nearest the bar code label, passes the illuminating beam 18 and receives a portion of the scattered light 20 reflected from bar code label 10. The portion of the received scattered light is that of a specific angle (with respect to the input beam) and depends on the distance of the head 12 from the bar code label and on the width of collector 24. Collector 24 receives a portion of the reflected light 20 and directs the received light to a photodetector 26. Photodetector 26 generates an analog electric signal, the amplitude of which is proportional to the intensity of the light received. Therefore, the electric signal represents the light received from the bar code label.

As will be described in greater detail below, in accordance with the present invention, the laser light source periodically produces the illuminating beam 18. In other words, the laser light source 16 is repeatedly and periodically is turned "on" and "off" in accordance with a predetermined duty cycle. Laser pulser 28 is electrically coupled to the laser light source 16 and produces a periodic signal having a predetermined duty cycle that controls operation of the laser light source.

The electric output signal current is provided from the photodetector to a transimpedance amplifier 30. Shown at 29 is a typical electric output current from the photodetector. When the laser light source is off, the photodetector produces an electric signal (represented by $P_{MA}$) solely as a result of the ambient light received by the photodetector. The ambient light may be produced as a result of high efficiency modulated light. Typical high efficiency lights, such as fluorescent lights, are modulated at approximately 50 kHz. When the laser light source is on, the signal produced by the photodetector is in response to the light reflected from the bar code label (represented by $P_{LBCM}$) plus that of the ambient modulated light ($P_{MA}$).

The transimpedance amplifier 30 converts the current output from the photodetector to a voltage with a high gain. A synchronous demodulator circuit 32 is connected to the transimpedance amplifier 30 and receives the voltage output by the transimpedance amplifier 30. The synchronous demodulator operates in two modes. The demodulator 32 operates to provide a first gain to the received voltage when the laser light source is "on" and to provide a second gain to the received voltage when the laser light source is "off". For example, as will be described in more detail below, when the duty cycle of the laser light source is equal to 50% (that is when the laser light source is "on" for the same amount of time that it is "off" for each cycle), the demodulator acts to provide a gain of 1 to the electric signal when the laser light source is "on" and to provide gain of −1 to the electric signal when the laser light source is "off".

Thus, for each on/off cycle of the light source, a positive gain of 1 is provided to the signal produced as a result of the ambient light plus the bar code label reflected light and a negative gain of 1 is provided to the signal produced solely as a result of the ambient light. The ambient light signal components then are effectively canceled for each cycle in downstream filtering circuitry because the level of ambient light noise remains substantially constant over a single cycle.

As can be seen in FIG. 1, the laser pulser 28 provides carrier synchronization pulses (which are either high or low) to the demodulator 32 at the duty cycle of the laser light source to control the mode of operation (the positive and negative gains) of the demodulator. It should be appreciated that the demodulator 32 is clocked at the same rate as the duty cycle of the laser light source. In one embodiment of the present invention, that rate is equal to 500 kHz.

If, alternatively, the duty cycle of the laser light source is "on" for 20% of the time and "off" for 80% of the time, then, for a given cycle, the current output of the photodetector will have a time-voltage product component due to ambient light that is four times as great as that due to light reflected from the bar code label plus the ambient light. Thus, the gain of the demodulator is set to 4 when the laser light source is "on" and is set to −1 when the laser light source is "off". By setting the gains appropriately, the terms associated with the ambient light ($P_{MA}$) will cancel themselves out (with ideal circuitry).

The output of the demodulator 32 is coupled to derivative amplifier 34 which provides amplification within a certain signal bandwidth and provides attenuation at a higher (i.e., carrier) frequency. For example, a typical derivative amplifier of the present invention could provide approximately 20 dB of gain around the signal bandwidth of 30 kHz and attenuation at the carrier frequency of 500 kHz. The derivative amplifier, in other words, provides a bandwidth-limited low frequency gain. The output of the derivative amplifier is provided to a bandpass filter that filters out-of-band unwanted signal components such as noise contributed by the carrier and amplifier noise. Given a 50% duty cycle of the laser pulser and a two-pole analog filter, the output of the filter gain stage 36 is represented by the following equation: $V_{POUT} = V_{PLBCM}/2 + V_{PMA}/2 - V_{PMA}/2 = V_{PLBCM}/2$. As shown in the equation above, the components of the signals contributed by the ambient noise ideally are canceled out.

The output of the filter gain stage 36 is provided to a digitizer 38 which digitizes the analog output signal of the filter gain stage to a digital word. A typical digitizer for use in the present invention is described in U.S. Pat. No. 5,210,397 to PSC, Inc., the assignee of the present application, which patent is herein incorporated by reference.

The digital word output by digitizer 38 is provided to decoder 40 which conventionally interprets the digital data to determine the code represented by the bar code label. Digital label data output by decoder 40 is provided on bus 42 to a host computer 44 which could, by example, be a hand-held terminal cash register or other computer.

An important feature of the present invention is that by controlling the duty cycle of the laser light source such that it repeatedly is "on" for a certain period of time then "off" for a certain period of time, and also by controlling the positive and negative gains of the demodulator circuit 32 in accordance with the duty cycle, the elements of the signal contributed by the ambient light are substantially canceled out.

Figure 2:
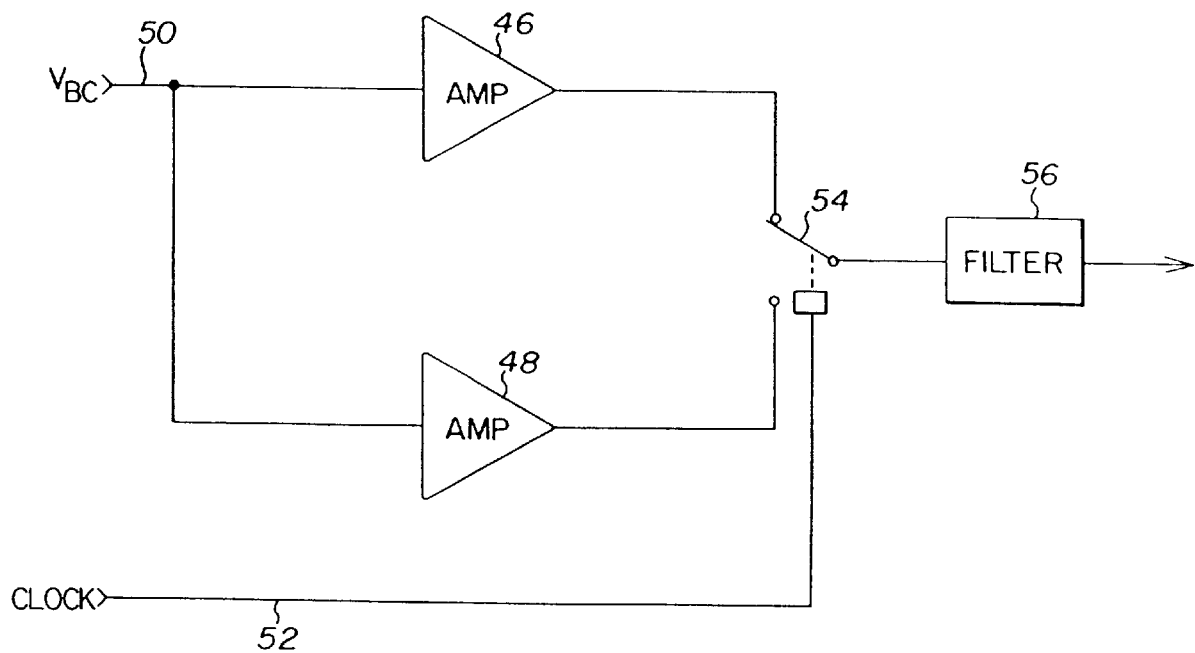
FIG. 2 is a schematic diagram of one embodiment of the demodulator circuit used in the system of FIG. 1.

FIG. 2 is a schematic diagram of one embodiment of the demodulator circuit 32 for use in the system shown in FIG. 1. As shown in FIG. 2, the demodulator circuit includes a first amplifier 46 and a second amplifier 48 connected in parallel. Each amplifier 46 and 48 receives, on line 50, the bar code signal which can, for example, have a carrier frequency of approximately 500 kHz. When the laser light source has a duty cycle of 50%, the first amplifier 46 is set to have a gain of positive N and the second amplifier 48 is set to have a gain of negative N. The gain of each amplifier could be set in accordance with the duty cycle selected. The output of each amplifier is provided through a switch 54 to a filter 56. Switch 54 is controlled by the laser pulser 28 which provides a clock signal on line 52. The clock signal can have a typical carrier frequency of 500 kHz. When the laser light source is on, switch 54 connects amplifier 46 to filter 56. When the laser light source is off, switch 54 connects amplifier 48 to filter 56. Filter 56 is a typical bandpass filter such as the one shown at 36 in FIG. 1.

As seen in FIG. 2, the demodulator circuit includes a first amplifier that provides a first gain to the bar code signal when the laser light source is "on" and a second amplifier 48 that provides a second gain to the bar code signal when the laser light source is "off". The gains of the respective amplifiers can be programmable or can be pre-set in accordance with the selected duty cycle.

Figure 3:
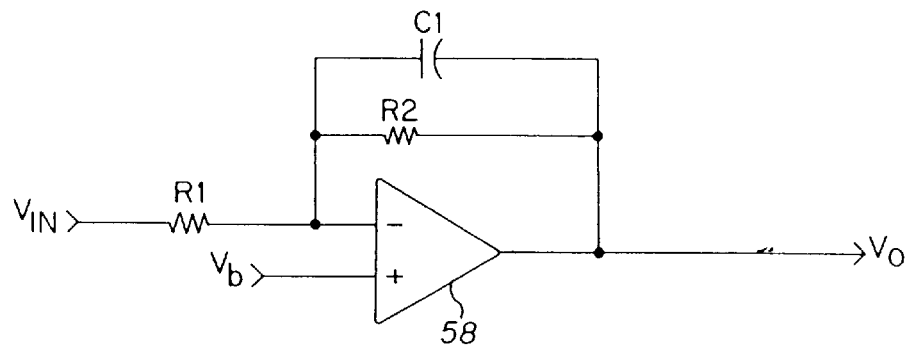
FIG. 3 is a schematic diagram of one embodiment of an analog filter used in the system of FIG. 1.
Figure 4:
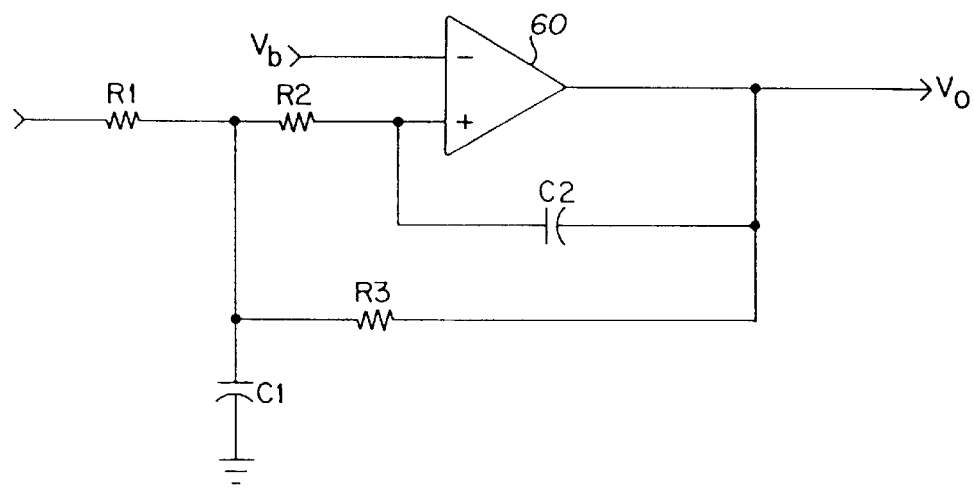
FIG. 4 is a schematic diagram of an alternate embodiment of an analog filter used in the system of FIG. 1.

Filter 36 can be an analog bandpass filter. Alternatively, filter 36 can be connected downstream of digitizer 38 and can be implemented as a digital filter. FIGS. 3 and 4 are schematic diagrams illustrating possible analog filters for use with the system of FIG. 1.

As shown in FIG. 3, a single-pole filter includes a differential voltage amplifer 58 including a non-inverting input that receives a bias voltage $V_b$ and an inverting input that receives an input voltage through resistor R1. Connected between the output and inverting input of the differential voltage amplifier are a capacitor C1 and resistor R2, connected in parallel.

FIG. 4 is a schematic diagram illustrating an alternative analog two-pole filter in which an differential voltage amplifer 60 receives a bias voltage $V_b$ at its non-inverting input and receives an input voltage through resistors R1 and R2, connected in series, at its inverting input. Connected between the output and inverting input of the differential voltage amplifer is a capacitor C2. Connected between the node between resistors R1 and R2 and the output of the differential voltage amplifer is a resistor R3. Connected between resistor R3 and ground is a capacitor C1.

Figure 5:
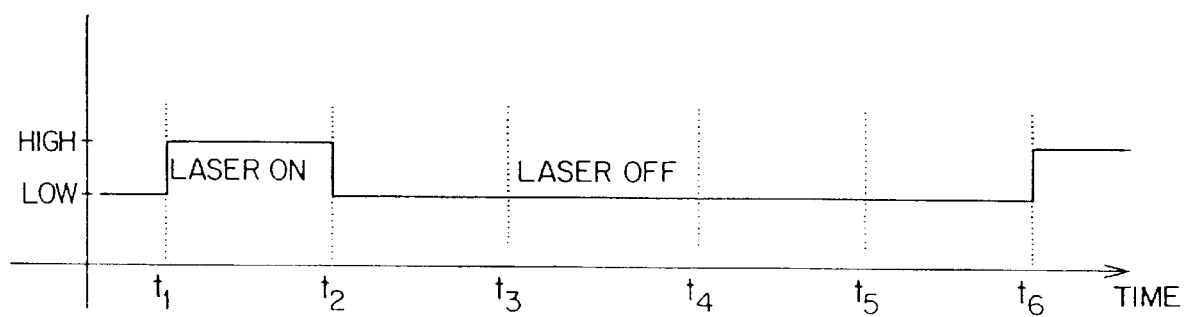
FIG. 5 is a timing diagram illustrating one possible duty cycle of the laser light source.

FIG. 5 is a timing diagram illustrating an alternative duty cycle of the laser light source. As previously stated, the synchronous demodulation technique is not limited to a 50% duty cycle, but can be designed for operation with any duty cycle limited only by the speed of the demodulator circuitry. The example shown in FIG. 5 has a 20%/80% duty cycle. In such an example, the laser light source is modulated at 20% "on" and 80% "off" per carrier cycle. The signal show has a high level when the light source is "on" and a low level when the light source is "off". One cycle of the light source is shown from time zero to time $t_6$ (time being represented on the horizontal axis). The light source is "on" from time $t_1$ to $t_2$ and is "off" from time $t_2$–$t_6$. The light source again goes "on" at time $t_6$. When the laser light source is on, the laser light source illuminates the bar code label and light reflected from the bar code label and ambient light are collected by the detector and processed electronically. The non-inverting amplifier of the demodulator circuitry provides a non-inverting gain to the electronic signal produced.

By contrast, when the laser light source is "off" (during 80% of each cycle), only ambient light is collected by the detector and processed by the processing circuitry. The electronic signal produced is processed by the inverting amplifier of the demodulator. Because the ambient light signal is approximately constant over one carrier clock cycle, the non-inverting gain must be four times larger than the inverting gain so that the sum of the ambient noise signal over each cycle ideally will be zero.

It should be appreciated that the duty cycle can be altered and the corresponding non-inverting gain and inverting gain of the demodulator can be altered to suit a particular application. In such an unsampled system (shown in FIG. 1), there is no improvement in the signal-to-ambient light noise ratio by altering the duty cycle of the laser light source from the 50% duty cycle. There is, however, improvement in the signal-to-electronic noise ratio for sampled systems, wherein the electronic noise is that produced by the circuit elements in the processing circuitry. This occurs because the peak optical power of the laser light source is higher for shorter duty cycles (to maintain constant average optical power, required for CDRH class II operation).

To maintain equivalent average electrical gains between implementations, the 20%/80% duty cycle system will have a normalized gain of 5 for ⅕ of the carrier period, and the 50% duty cycle system will have a normalized gain of 2 for ½ of the carrier period. Because the inverting gain of the 20%/80% system is –5/4 for ⅘ of the carrier period, and the inverting gain of the 50% duty cycle system is –2 for ½ of the carrier period, the noise gains of the two systems are equivalent, and both systems have a normalized voltage•product gain of 1.

The improvement in signal-to-electronic noise ratio occurs in sampled systems because the 20%/80% duty cycle system can have an illuminating source that has 2.5 times the optical power of that of the 50% system, and hence a signal-to-electronic noise ratio improvement of 2.5 to 1 occurs. Thus, in systems where it is possible to alter the non-inverting gain and the inverting gain of the demodulator, it is preferable to have a duty cycle in which the laser light source is "on" for less time than it is "off" during each cycle.

Figure 6A:
FIG. 6 is a block diagram of another, sampling embodiment of a bar code scanner system of the invention.
Figure 6:
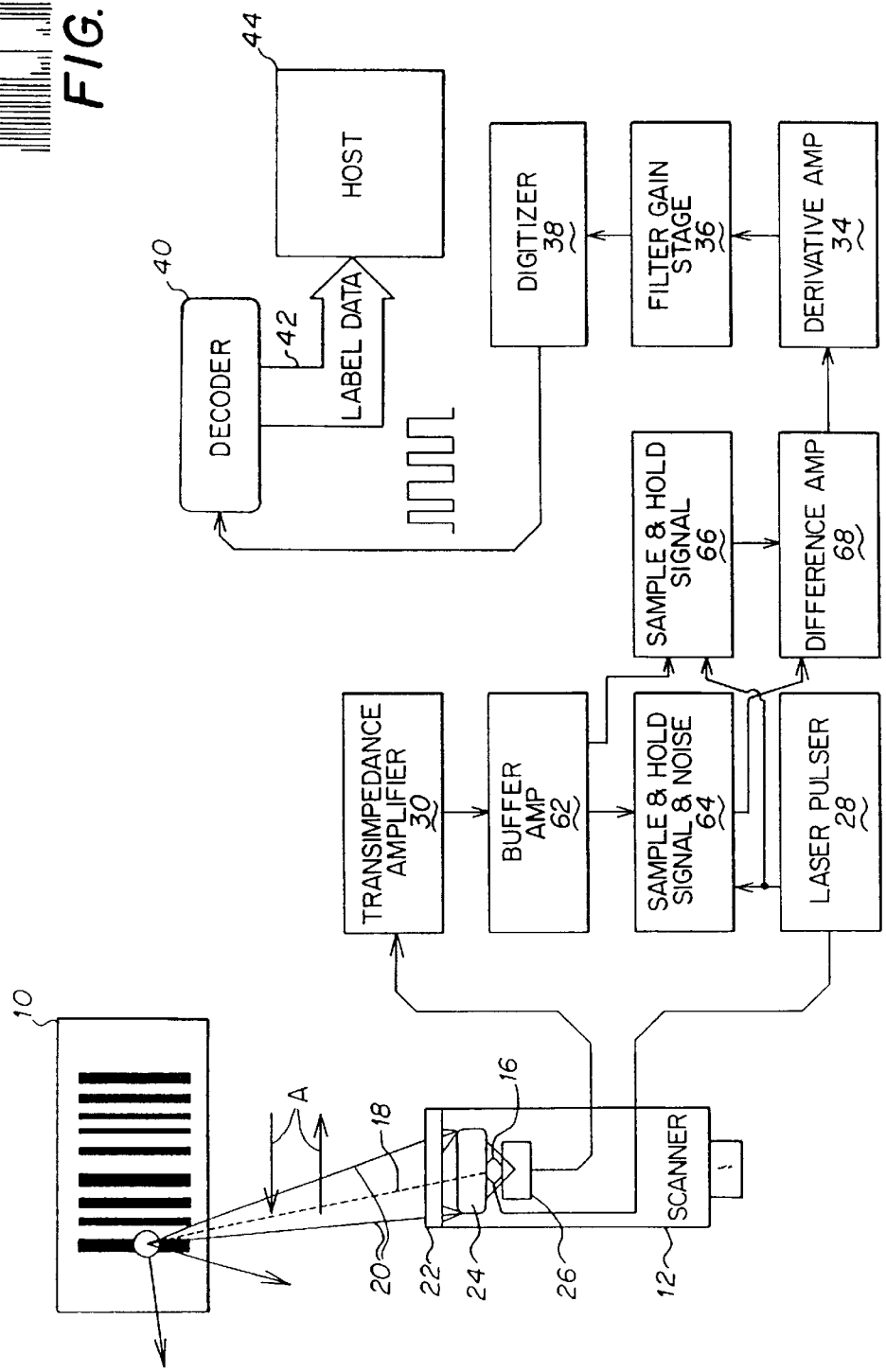

FIG. 6 is a block diagram of an alternate embodiment of the system of the present invention. The system of FIG. 6 is identical to that of FIG. 1 except for the buffer amplifier 62, sample and hold circuits 64 and 66 and difference amplifier 68. The buffer amplifier 62 is a low impedance, high output current amplifier that receives the output of the transimpedance amplifier. The output of the buffer amplifier is provided to both sample and hold circuits 64 and 66. The sample and hold circuit 64 is enabled a short time delay after the laser light source has been turned "on" during each laser light source cycle to enable the processing circuitry to process the signal produced as a result of the light source being "on". The sample and hold circuit 64 samples the signal received from the buffer amplifier and holds the value of that sampled signal for a certain constant duration. Sample and hold circuit 64 samples and holds the electric signal produced as a result of the light reflected from the bar code label plus the ambient light. That sampled signal then is provided to difference amplifier 68.

Similarly, during each laser light source cycle, sample and hold circuit 66 is enabled a short time delay after the laser light source has been turned "off" and it samples and holds, for the same constant duration, the electric signal produced solely as a result of the ambient light. The laser pulser enables and disables the sample and hold circuits 64 and 66 at the appropriate times. The difference amplifier 68 produces an electronic difference signal that is the difference between the sampled signal provided by the sample and hold circuit 64 and the sampled signal provided by the sample and hold circuit 66 during each cycle. The difference signal is the difference between the signal generated as a result of the bar code label signal plus the ambient noise and that just of the ambient noise. Thus, the ambient noise component ideally is canceled out. The difference signal then is provided to the derivative amplifier 34 and then to the filter 36 and digitizer 38, as described above with respect to FIG. 1.

Because the signal produced as a result of the ambient light and the signal produced as the a result of the light reflected from the bar code label are approximately constant over the laser clock cycle, the sampled data (system of FIG. 6) is approximately identical in value to the unsampled signal levels (system of FIG. 1). An important advantage of the sampled system occurs because each sample is held until it is updated, and thus the non-inverted and inverted samples will be equal in duration and offset in phase corresponding to the duty cycle ratio of the light source. Therefore, the non-inverting and inverting gains will always be equal in magnitude independent of the carrier duty cycle selected. Thus, the difference amplifier can generate a direct difference signal and the non-inverting and inverting gains do not need to be programmed or preset for each duty cycle alteration, as in the unsampled embodiment of FIG. 1.

Figure 7:
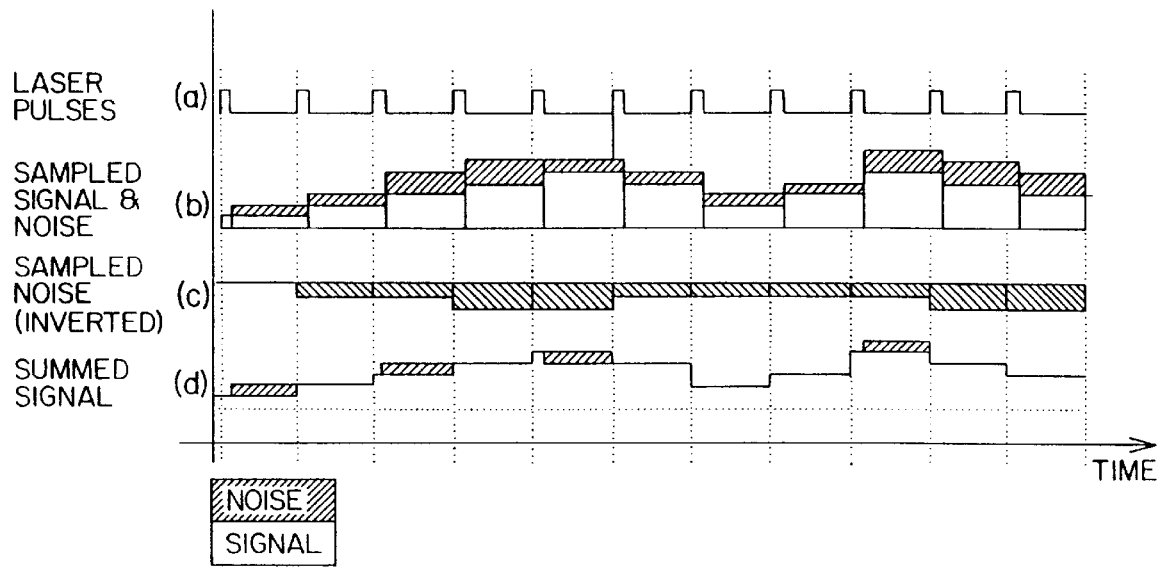
FIG. 7 is a timing diagram illustrating the advantages of the sampling embodiment of FIG. 6 when used with a particular laser light source duty cycle.

The timing diagram of FIG. 7 illustrates certain signals of the sample and hold system (See FIG. 6) of the present invention with a laser pulse duty cycle of 20% "on" and 80% "off". Shown in FIG. 7 are the following signals along the same time scale (the horizontal axis): (a) the laser pulses wherein a high level pulse is when the laser light source is "on" and a low level pulse is when the light source is off; (b) the sampled signal from the light reflected from the bar code label (unshaded) plus the ambient light noise (shaded); (c) the inverse of the sampled ambient light noise signal; and (d) the difference signal which is the output of the difference amplifier 68 of FIG. 6.

As shown at (a), the laser pulses are "on" for 20% of the time and "off" for 80% of the time during each cycle. Shown at (b) is the sampled signal output from sample and hold circuit 64 and includes the bar code label signal plus the ambient light noise signal. The signal shown at (c) simply is the inverse of the output of the sample and hold circuit 66 which is the inverse of the signal generated solely from the ambient light. It should be noted that each sample is held until it is updated so that the non-inverted and inverted samples are equal in duration and offset in phase in accordance with the duty cycle ratio of the laser light source. Thus, as previously stated, the non-inverting and inverting gains always are equal in magnitude.

Shown at (d) is the sum of the signals shown at (b) and (c), or the output of the difference amplifier 68. Note that some noise still remains in the summed signal because the rejection of the noise is not perfectly ideal due to the limited carrier frequency. As the carrier frequency becomes much higher, the signal-to-noise ratio of the system improves.

One advantage of the sampled data system is that the filtered output of the sampled data will be twice that of the filtered output of the unsampled data using a 50% duty cycle and four times that of the filtered output of the unsampled data using a 20%/80% duty cycle. The increased magnitude in the filtered output signal improves the signal-to-electric noise ratio.

Figure 8:
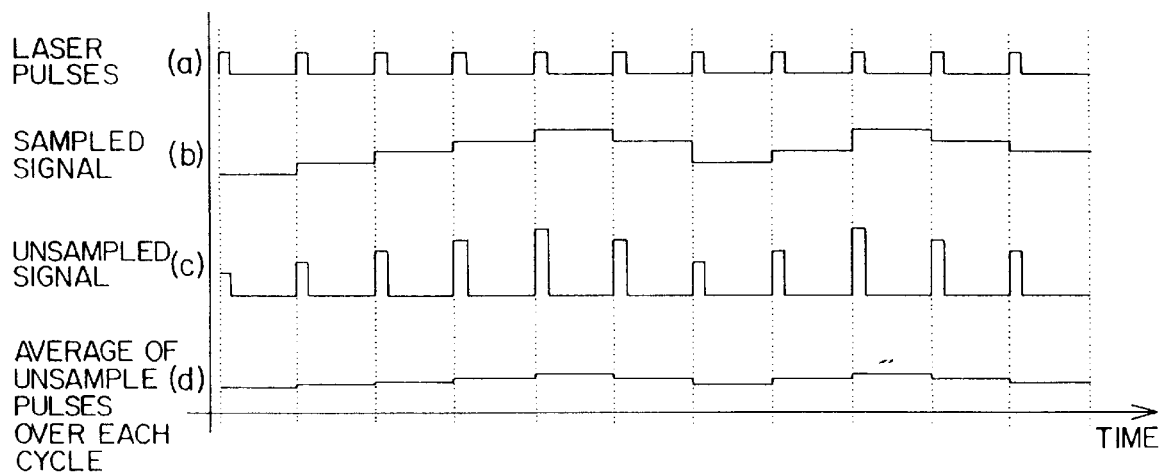
FIG. 8 is a timing diagram further illustrating advantages of the sampling embodiment of FIG. 7 when used with a particular laser light source duty cycle.

The timing diagram of FIG. 8 illustrates the advantage of the sampled system (FIG. 6) over the unsampled system (FIG. 1) in terms of the increased magnitude in the sampled signal for a given duty cycle. Shown in FIG. 8 are the following signals: (a) the laser pulses according to a 20%/80% duty cycle; (b) the sampled signal (from the light reflected from the bar code label) without the noise using a sample and hold technique; (c) the unsampled signal using a system such as the one described in FIG. 1; and (d) the average magnitude over each cycle of the unsampled signal shown in (c). As shown, the sampled signal (b) achieves a higher magnitude than the average of the unsampled signal at (d) over each cycle of the laser light source because the sampled signal is sampled and then held for the duration of each cycle. Thus, the sampled data technique of FIG. 6 improves the signal-o-noise ratio by increasing the magnitude of the signal.

The following example may help illustrate a further advantage of the sampled system. In an unsampled system having a 50% duty cycle, the filtered bar code signal is approximately equal to one half of the amplitude of the same filtered bar code signal using a sampled system having the same duty cycle. In both cases, the ambient noise levels are approximately equal. This occurs because the ambient noise is approximately constant over a laser pulse cycle. As a result, the sampled system has approximately twice the signal-to-noise ratio of the unsampled system at a 50% duty cycle.

When using a 20% on/80% "off" duty cycle, the sampled system compares even more favorably to the unsampled system with a 50% duty cycle because the laser power that illuminates the bar code label is 2.5 times the optical power of the 50% duty cycle system. This distinction results in the sampled filtered bar code signal for the 20% on/80% of duty cycle sample system being five times greater than the unsampled filtered bar code signal for the 50% duty cycle system. This accounts for the factor of one half after filtering for the unsampled 50% duty cycle system. Both systems have approximately equivalent noise levels. Therefore, approximately a five to one signal-to-noise ratio improvement results.

Figure 9B:
FIG. 9 is a block diagram of a further, digital implementation embodiment of a bar code scanner system of the invention.
Figure 9:
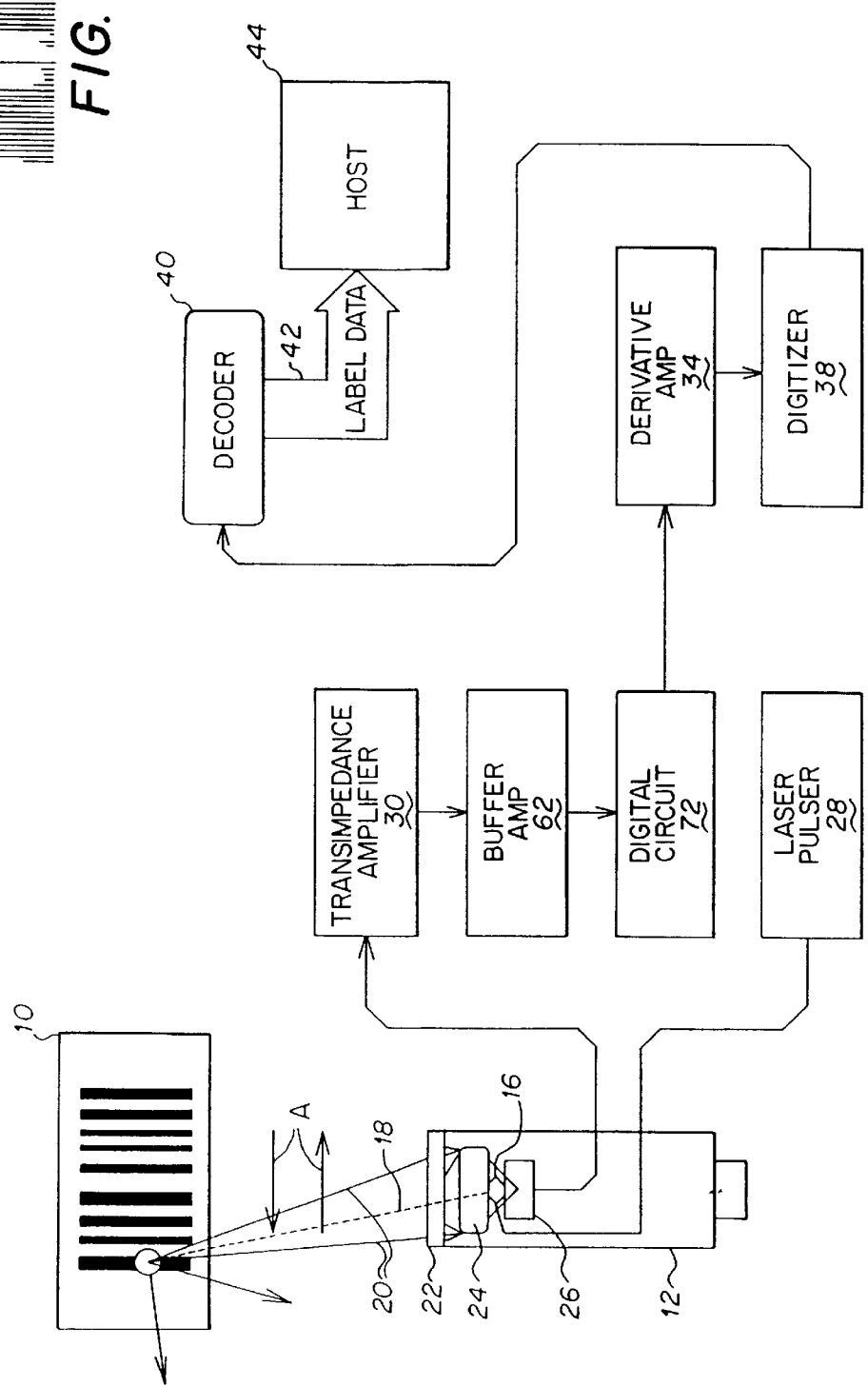
Figure 9B:
Figure 9A:
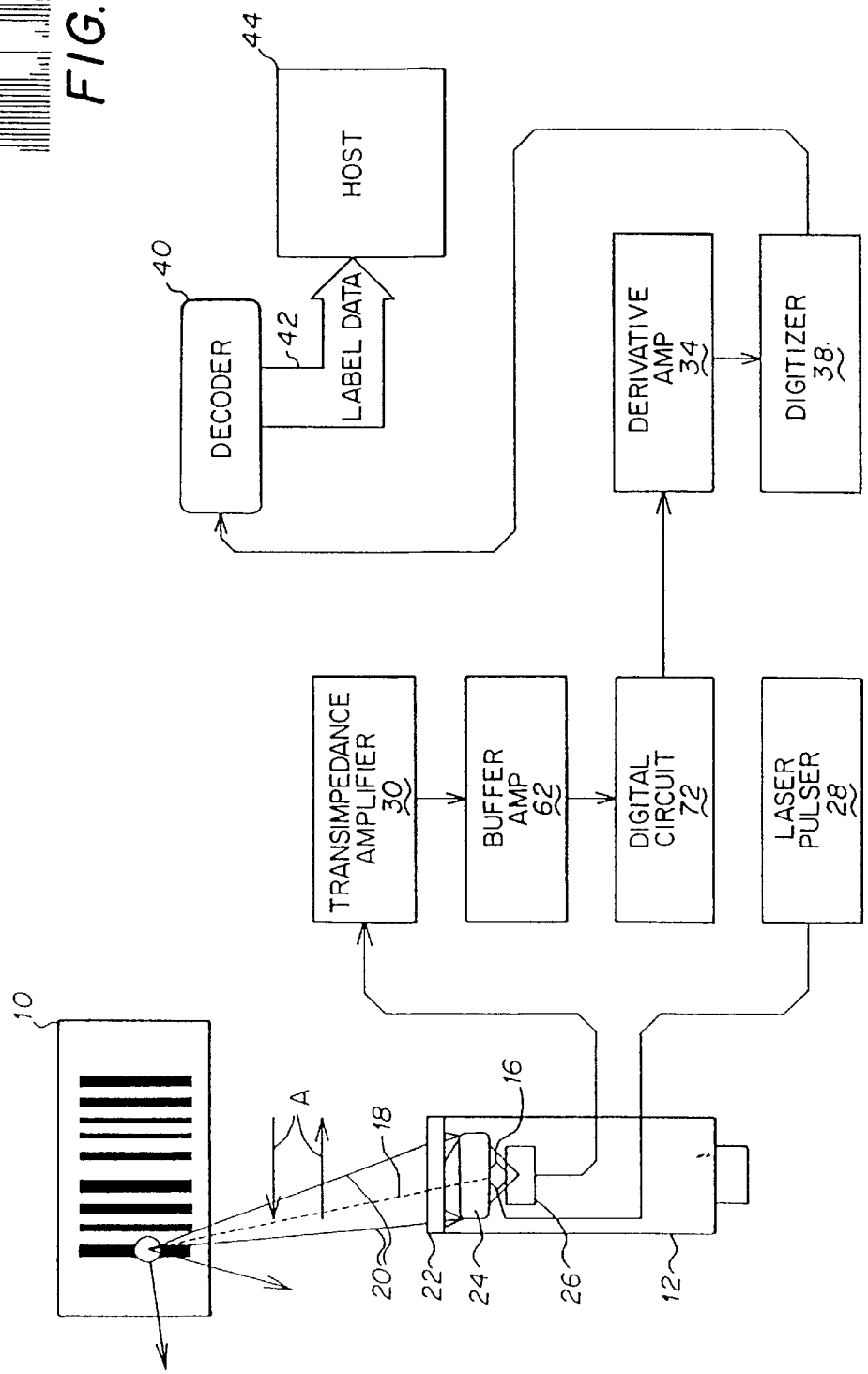

FIG. 9 illustrates another embodiment of the system of the present invention in which the demodulation of the signals is performed digitally. The block diagram of FIG. 9 is identical to that of FIG. 6 except that the digital demodulation circuit 72 replaces the sample and hold circuits 64 and 66 and the difference amplifier 68. The digital demodulation circuit operates by digitally applying a positive gain to the bar code signal plus ambient light noise (produced when the laser light source is on) and provides negative gain to the signal resulting solely from the ambient noise (when the laser light source is off). In the sampled system, the digital demodulation circuit provides a non-inverting gain of 1 and an inverting gain of −1.

Figure 10:
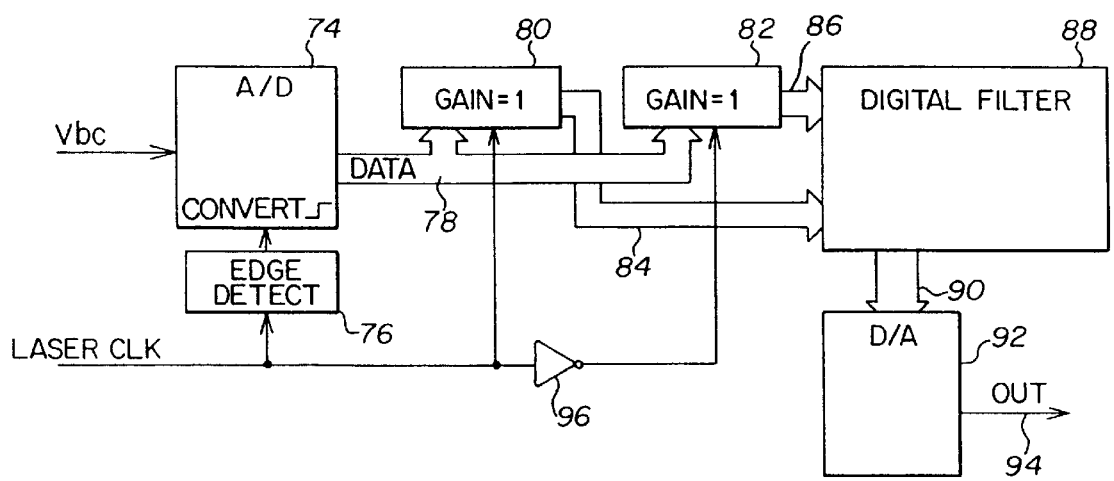
FIG. 10 is a block diagram of a digital demodulation/filter circuit for use in the system of FIG. 9.

FIG. 10 is a block diagram illustrating the components of the digital demodulation circuit 72 used in the system of FIG. 9. As shown, the system includes an ADC 74, and edge detect element 76, a non-inverting gain element 80, an inverting gain element 82, a digital filter 88 and a DAC 92. During operation, the ADC 74 receives the voltage Vbc output from the buffer amplifier. This voltage Vbc includes either the bar code signal plus ambient light noise (when the laser light source is on) or simply the ambient light noise (when the laser light source is off). ADC 74 converts the voltage to a digital word and provides that word along bus 78 to both gain elements 80 and 82. Edge detect element 76 receives the laser clock pulse as an input and provides an output signal to clock the ADC 74. Edge detect element 76 provides a phase delay between when the laser light source is turned "on" or "off" (at positive and negative edges of the laser clock pulse) and when the ADC actually converts the input voltage to a digital data word to allow the system to settle, enabling the final voltage level to reach the input of the ADC.

The laser clock pulse also is provided to non-inverting gain element 80 and the inverse of the laser clock pulse (inverted by inverse element 96) is provided to inverting gain element 82 such that the non-inverting gain element is enabled when the laser light source is "on" and is disabled when the laser light source is "off" and the inverting gain element 82 is enabled when the laser light source is "off" and is disabled when the laser light source is "on". Thus, non-inverting gain element 80 provides a non-inverting gain to the digital data that results from the bar code signal plus ambient light noise and the inverting gain element provides an inverting gain to the digital data resulting solely from the ambient light noise.

Non-inverting gain element 80 provides output data along bus 84 to digital filter 88. Inverting gain element 82 also provides output data on bus 86 to digital filter 88. Digital filter 88 combines the words, reduces out-of-band signal components and provides an output on bus 90 to DAC 92 which converts the output filtered word to an analog signal. The analog signal is output line 94. It should be appreciated that, in this digital embodiment, the ADC samples are synchronous with the laser pulses so that contiguous samples of bar code signal plus ambient noise and ambient noise alone are obtained and processed with the appropriate gains and inversions and then filtered using digital signal processing filtering techniques.

Having thus described at least one illustrative embodiment of the invention, various alterations, modifications and improvements will readily occur to those skilled in the art. While particular duty cycles, clock rates and modes of operation have been described, they are intended as being exemplary and the invention should not be so limited. Also, exemplary circuitry has been shown and described and the invention also should not be so limited. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A bar code scanner system comprising:

a laser light source that periodically produces a light beam that is swept across a bar code label, the laser light source being periodically turned "on" and "off" according to a duty cycle;

a detector that produces a first electric signal representative of received ambient light and light reflected from the bar code label when the light source is "on" and produces a second electric signal representative of received ambient light when the light source is off;

an ADC, coupled to the detector, that respectively converts the first and second electric signals to first and second digital words;

a digital circuit, coupled to the ADC, that provides a first gain to the first digital word and provides a second gain to the second digital word; and a filter, coupled to the digital circuit, reduces out-of-band signal components of the digital words.

2. A method for detecting the code of a bar code label comprising the steps of:

periodically producing a light beam with a light source that is swept across a bar code label according to a duty cycle;

receiving ambient light and light reflected from the bar code label when the light source is on;

producing a first electric signal representative of the intensity of the received ambient light and bar code label reflected light;

receiving ambient light when the light source is off;

producing a second electric signal representative of the intensity of the received ambient light;

providing a first gain to the first electric signal;

providing a second gain to the second electric signal; and filtering out-of-band signal components of the electric signals.

* * * * *